United States Patent
Osawa et al.

(10) Patent No.: US 6,618,501 B1
(45) Date of Patent: Sep. 9, 2003

(54) OBJECT SIMILARITY CALCULATION METHOD AND APPARATUS

(75) Inventors: Hidefumi Osawa, Urawa (JP); Yasuo Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/563,321

(22) Filed: May 3, 2000

(30) Foreign Application Priority Data

May 6, 1999 (JP) ............................................ 11-126399

(51) Int. Cl.[7] .............................. G06K 9/64; G06K 9/80
(52) U.S. Cl. ........................ 382/165; 382/199; 382/207; 382/218; 382/276; 382/240
(58) Field of Search ................................. 382/207, 209, 382/217, 165, 276, 280, 281, 197, 199, 218, 240

(56) References Cited

U.S. PATENT DOCUMENTS

| | | | |
|---|---|---|---|
| 6,381,370 B1 * | 4/2002 | Wu | 382/243 |
| 6,532,307 B1 * | 3/2003 | Sato | 382/240 |
| 2002/0178135 A1 * | 11/2002 | Tanaka | 707/1 |
| 2003/0044073 A1 * | 3/2003 | Matsugu et al. | 382/195 |

OTHER PUBLICATIONS

Man et al, An enhanced approach to character recognition by Fourier descriptor, Singapore ICCS/ISITA '92, Nov. 16–20, 1992, vol. 2, p 558–562.*

Tieng et al, Object identification using the dyadic wavelet transform and indexing techniques, 1995 International Conference on Acoustics, Speech, and Signal Processing, May 9–12, 1995, vol. 4 p 2475–2478.*

Loum et al, A new method for texture classification based on wavelet transform, Proceedings of the IEEE–SP International Symposium on Time–Frequency and Time–Scale Analysis, Jun. 18–21, 1996, p 29–32.*

Wang et al, A discrete wavelet model for target recognition, IEEE 39th Midwest symposium on Circuits and Systems, Aug. 18–21, 1996, vol. 2, p 835–838.*

Tieng et al, Recognition of 2D object contours using the wavelet transform zero–crossing representation, IEEE Transactions on Pattern Analysis and Machine Intelligence, Aug. 1997, vol. 19, p 910–916.*

Boles et al, A method for recognising household tools using the wavelet transform, Proceedings of IEEE TENCON '97, Dec. 2–4, 1997, vol. 2, p 535–538.*

(List continued on next page.)

*Primary Examiner*—Bhavesh M. Mehta
*Assistant Examiner*—Christopher Sukhaphadhana
(74) *Attorney, Agent, or Firm*—Fitzpatrick, Cella, Harper & Scinto

(57) ABSTRACT

Although methods employing chain codes or Fourier descriptors are known for calculating an outline similarity between a model image and an object image, these methods are difficult to achieve detection of both an approximate similarity and local similarity. In view of this, according to the present invention, wavelet transformation is performed on outline points of an object image, and similarity calculation is performed on a plurality of model images with the use of a low frequency component of the transformation result. Only the model image, having a close agreement in matching processing, is subjected to similarity calculation using a high frequency component of the transformation result. By virtue of this processing, similarity calculation can be performed at high speed with high precision.

12 Claims, 10 Drawing Sheets

OTHER PUBLICATIONS

Paulik et al, A multiwavelet model for 2D object analysis and classification, Proceedings of the 1998 Midwest Symposium on Circuits and Systems, Aug. 9–12, 1998, p 383–386.*

Cheikh et al, Multi–level shape recognition based on wavelet–transform modulus maxima, Proceedings of the 4th IEEE Southwest Symposium on Image Analysis and Interpretation, Apr. 2–4, 2000, p 8–12.*

* cited by examiner

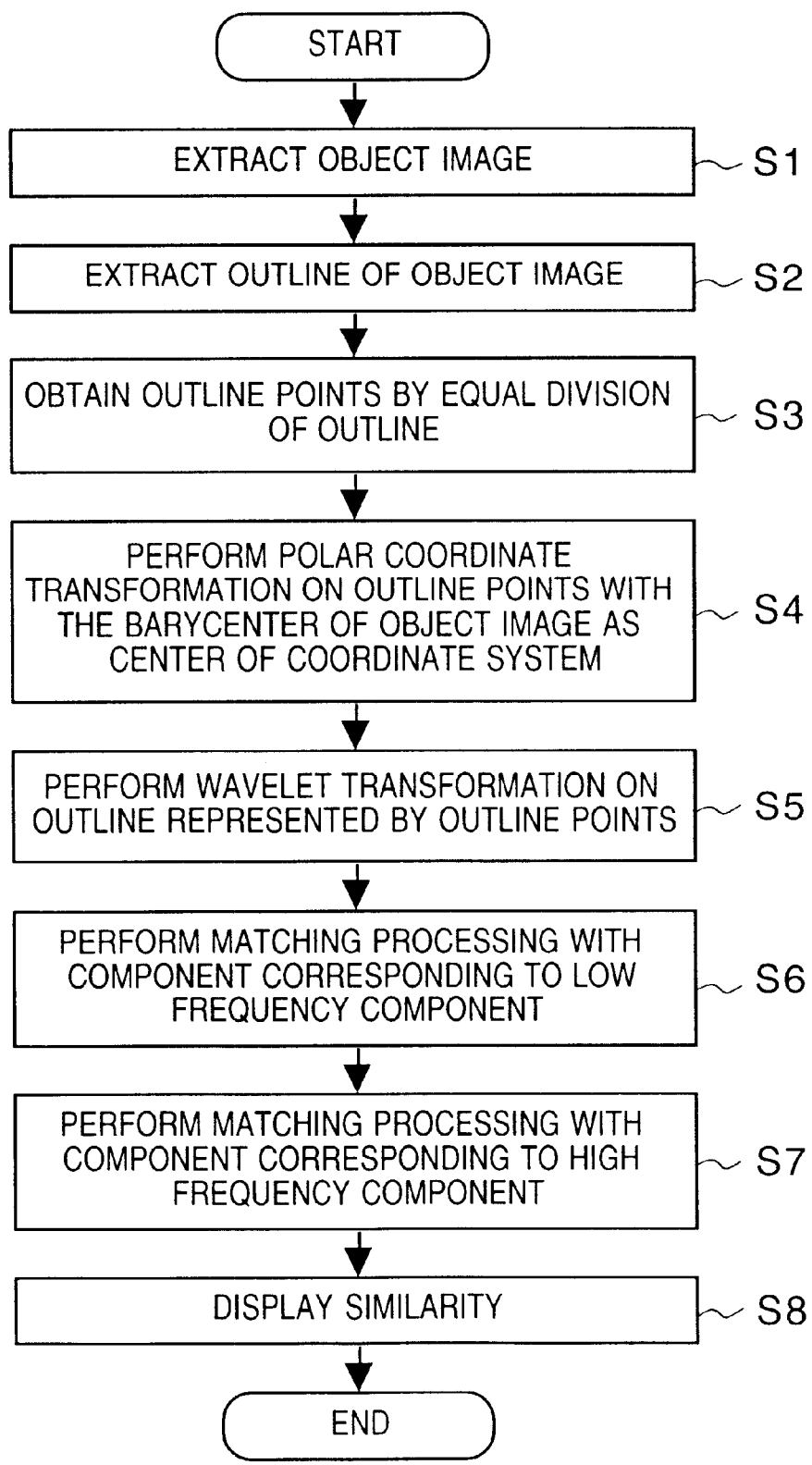

OBJECT SIMILARITY CALCULATION METHOD AND APPARATUS

FIELD OF THE INVENTION

The present invention relates to an image processing method and apparatus for calculating an outline similarity between an object image and a model image.

BACKGROUND OF THE INVENTION

As a conventional method of calculating an outline similarity between a silhouette image of an object of an original image and a silhouette image of a model image, methods employing chain codes or Fourier descriptors are known.

According to the outline similarity calculation method employing chain codes, outline or line segment components are followed while quantizing the direction of the outline or line segment components, and the quantized values are recorded as a code. For instance, assuming a case of quantizing an outline in eight directions, a string of numerals including 0 to 7 are obtained as a code. Then, the difference is calculated between the obtained code of an object and that of a model object (hereinafter referred to as an object), thereby determining the similarity.

According to the outline similarity calculation method employing Fourier descriptors, a periodic function representing a curve of the outline is obtained, and Fourier series expansion is performed to obtain coefficients of the Fourier series, which represent characteristics of a closed curve. Then, the difference is calculated between the string of coefficients of the object and that of the model object, thereby determining the similarity.

However, according to the foregoing conventional method employing chain codes, since the similarity is determined based only on the difference of outline directions, all differences are detected even if the difference in the outline shape is quite small. Therefore, not only a long processing time is required, but also it is difficult to determine the similarity of roughly similar images.

Furthermore, according to the foregoing conventional method employing Fourier descriptors, although an approximate similarity can be calculated, it is difficult to determine the similarity of local portions, e.g., presence of corners or the like.

SUMMARY OF THE INVENTION

The present invention has been proposed to solve the conventional problems, and has as its object to provide an image processing method and apparatus capable of similarity calculation between a model image and an object image at high speed with high precision.

According to the present invention, the foregoing object is attained by providing an image processing method comprising: an object extraction step of extracting an object image from image data; an outline point extraction step of extracting a predetermined number of outline points from an outline of the object image; a wavelet transformation step of performing wavelet transformation on the outline points; and a similarity calculation step of calculating a similarity between the object image and a predetermined model image based on a wavelet transformation result.

The invention is particularly advantageous since similarity calculation between a model image and an object image can be executed at high speed with high precision.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart showing a similarity calculation processing according to the first embodiment;

DETAILED DESCRIPTION OF THE PREFERRED EMBODIMENTS

Preferred embodiments of the present invention will now be described in detail in accordance with the accompanying drawings.

First Embodiment

Functional Configuration

Figure 1:
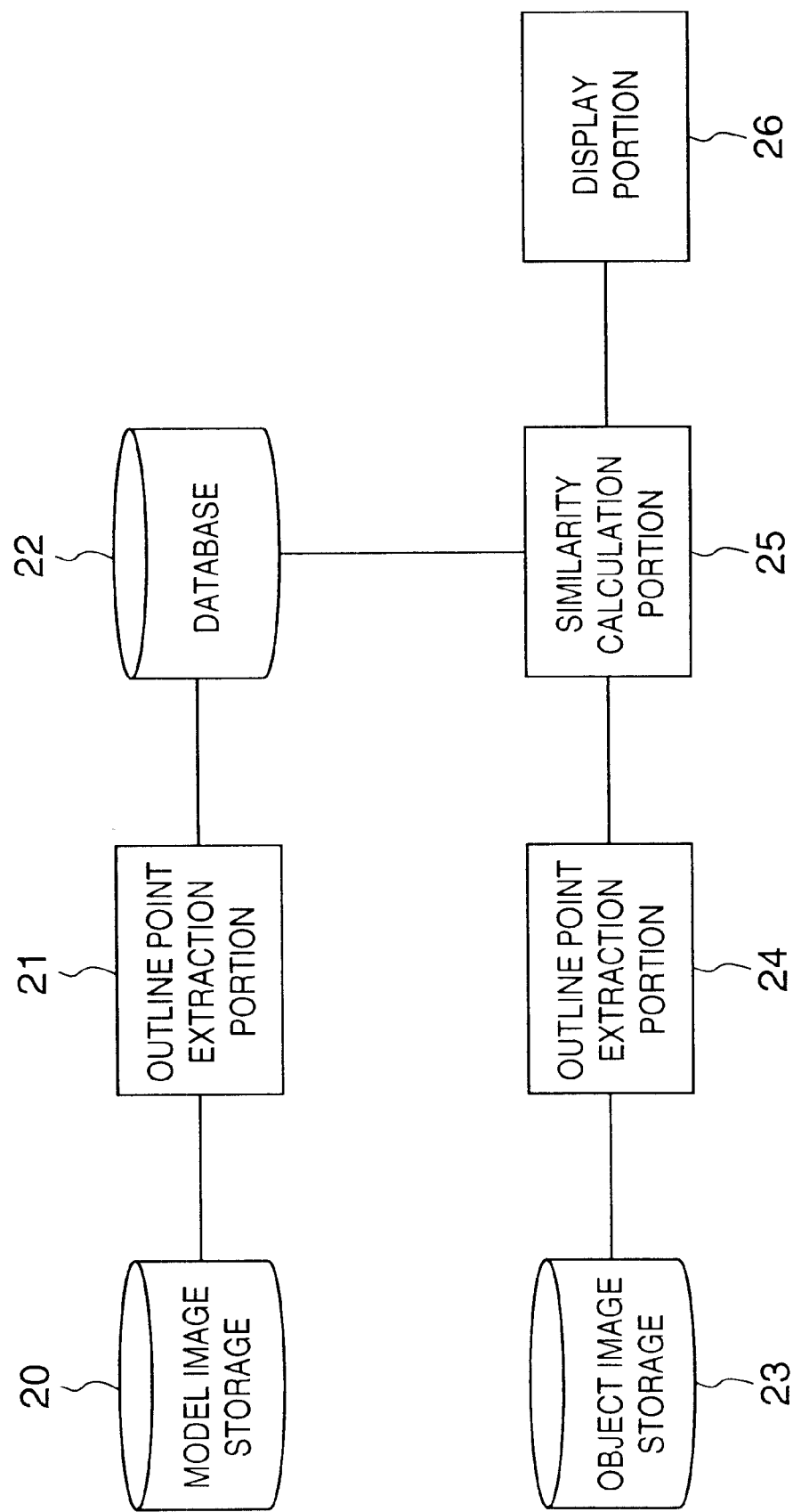
FIG. 1 is a block diagram showing a similarity calculation function according to a first embodiment of the present invention.

FIG. 1 is a block diagram showing an outline similarity calculation function according to the first embodiment. In FIG. 1, reference numeral 20 denotes a model image storage where model silhouette images (hereinafter simply referred to as model images), subjected to similarity calculation, are stored in advance. Reference numeral 21 denotes an outline point extraction portion, where outline point coordinates are extracted from the model image, and wavelet transformation is performed. The resultant data is stored in a database 22. The database 22 stores plural types of model image data.

Reference numeral 23 denotes an object image storage, where objects are extracted from a sample image and silhouette images of the extracted objects (hereinafter simply referred to as an object image) are stored. Reference numeral 24 denotes an outline point extraction portion where outline point coordinates are extracted from the object image and wavelet transformation is performed.

Reference numeral 25 denotes a similarity calculation portion for calculating the similarity of an object image to each of the plurality of model images registered in the database 22. The calculated results are displayed on a display portion 26. As a display method, for instance, a plurality of model images may be displayed in order of those having smallest differences with the object image, i.e., in order of higher similarity.

Brief Description of Similarity Calculation Processing

FIG. 2 is a flowchart showing a similarity calculation processing according to the first embodiment. Assume that data for a plurality of model images, on which wavelet transformation has been performed, is stored in the database 22 before the similarity calculation processing is started.

In step S1, a silhouette image of an object is extracted from, for instance, a sample grayscale image, and the extracted image is stored in the object image storage 23 as an object image.

Next in step S2, an outline of the object image, obtained in step S1, is extracted. In step S3, the outline of the object image obtained in step S2 is equally divided by N to obtain outline points. In step S4, the obtained outline points are subjected to polar coordinate transformation with the barycenter of the object image as the center of the coordinate system. In step S5, the outline represented by the outline points is transformed into a wavelet descriptor. The above-described steps S2 to S5 are executed by the outline point extraction portion 24.

In step 6, the similarity of the outline is calculated between the object image and a model image by using a component corresponding to the low frequency component of the outline. The similarity calculation is, in other words, a matching processing between the object image and model image. With regard to the model image having a close agreement with the object image in the matching processing in step S6, matching processing with higher precision is performed in step S7 by using a component corresponding to the high frequency component of the outline. The matching processing in steps S6 and S7 is executed by the similarity calculation portion 25.

In step S8, the matching result obtained in steps S6 and S7, i.e., the similarity, is displayed on the display portion 26 to inform the user.

Hereinafter, each of the processing shown in FIG. 2 is described in detail.

Object Extraction Processing

The aforementioned object image extraction processing in step S1 is described with reference to FIGS. 3A and 3B.

Figure 3A:
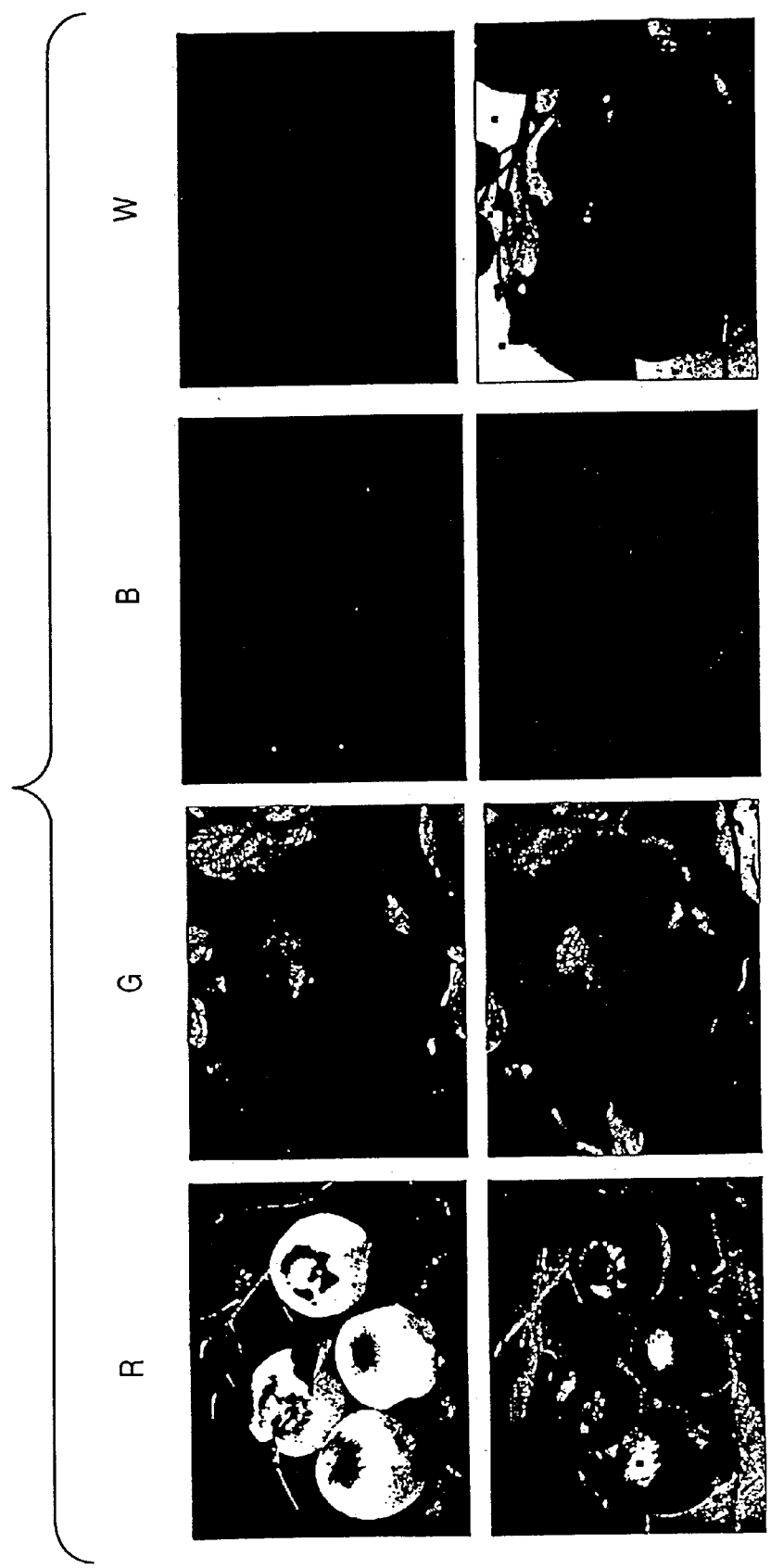
FIGS. 3A and 3B show an example of extracted silhouette images.
Figure 3B:
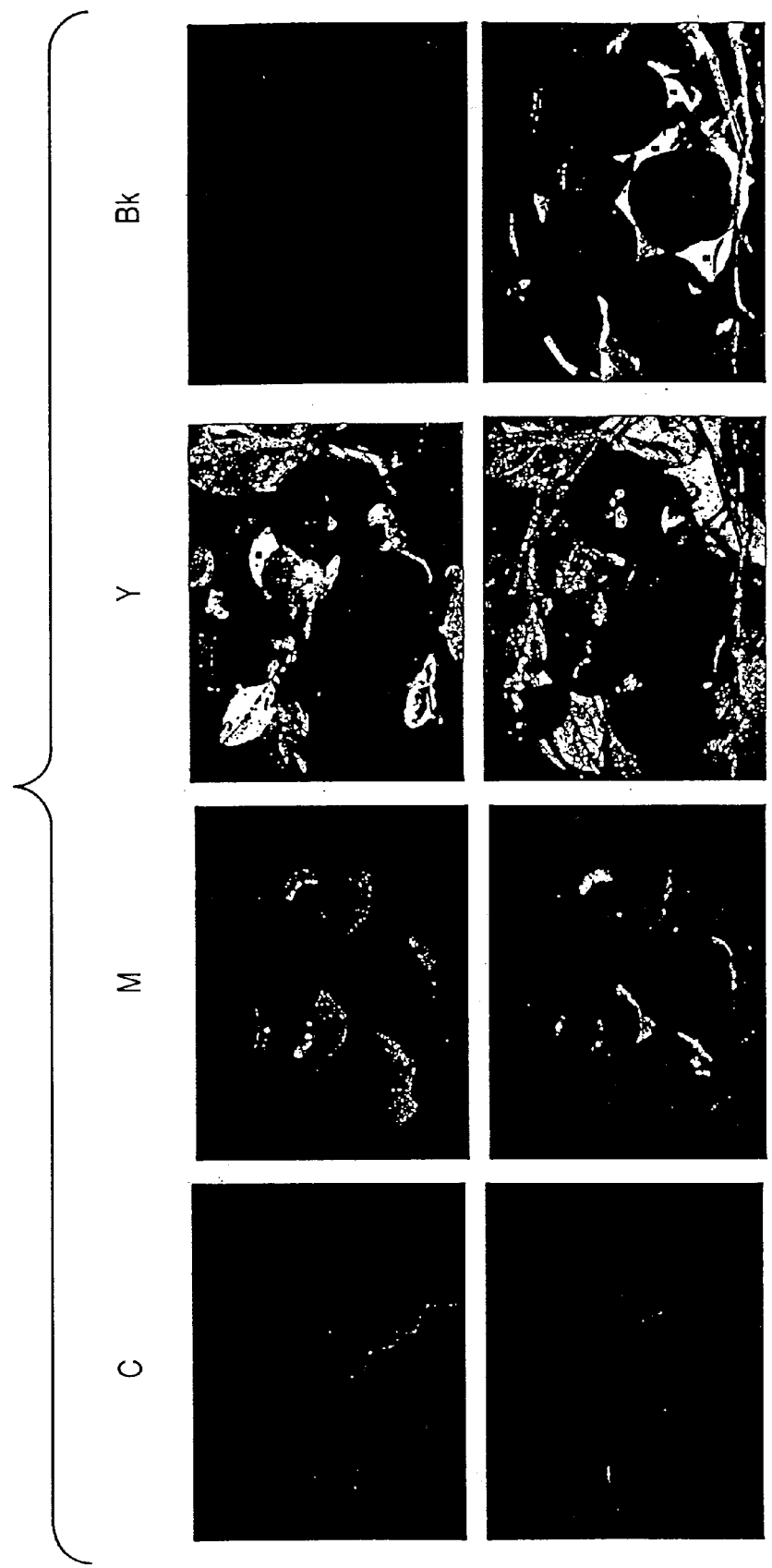

Sixteen images shown in FIGS. 3A and 3B are an example of labeling images obtained by clustering an original image (not shown) with sixteen typical colors. The sixteen typical colors consist of high chromatic and low chromatic colors of the six colors shown in FIGS. 3A and 3B: red (R), green (G), blue (B), cyan (C), magenta (M), and yellow (Y); and high chromatic and low chromatic colors of the two colors shown in FIGS. 3A and 3B: white (W) and black (Bk) (i.e., white, pale gray, dark gray, and black). In the sixteen labeling images shown in FIGS. 3A and 3B, white portions are called labeling portions.

In the first embodiment, in each of the sixteen labeling images, linking labeling portions are detected and an independent object is extracted. Then the pixels which are included in the extracted object but not included in the labeling portions are filled in. By this, extraction of the silhouette image of an object (object image) is realized.

Note that since a known method is employed for the outline extraction processing in step S2, detailed description is omitted.

Outline Division Processing and Polar Coordinate Transformation Processing

Hereinafter, a preparatory processing in steps S3 and S4 for the aforementioned wavelet transformation is described.

Figure 4B:
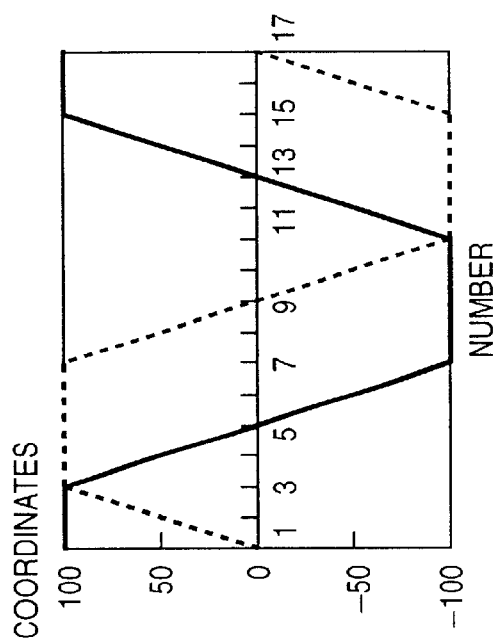
FIGS. 4A and 4B are views explaining an outline curve.
Figure 4A:
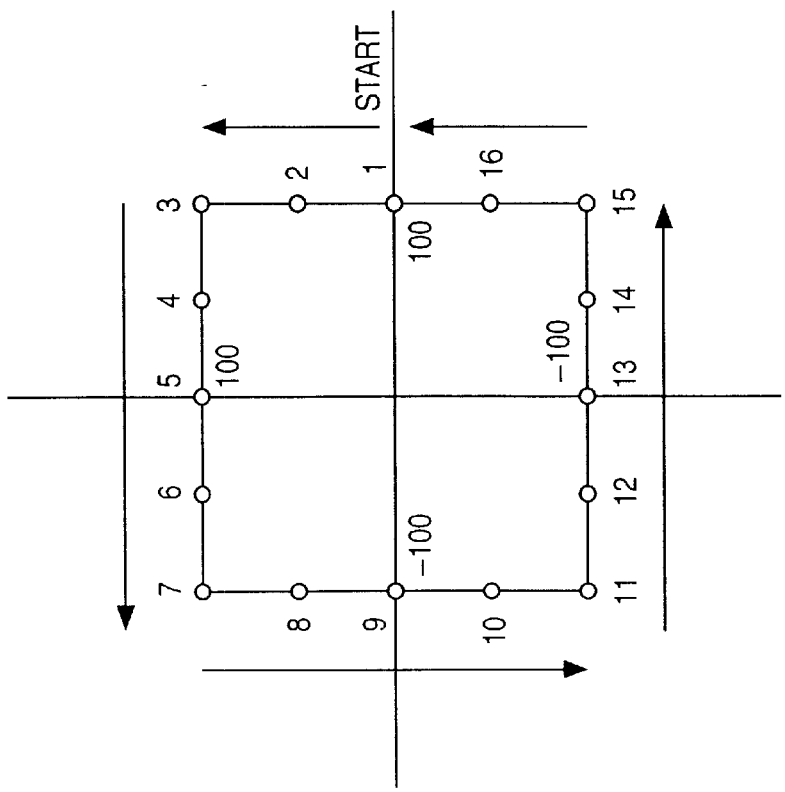

First, the processing in step S3 for obtaining outline points of the object image is described with reference to FIGS. 4A and 4B. FIGS. 4A and 4B are explanatory views for obtaining outline points and outline curve from an outline according to the first embodiment.

FIG. 4A shows sixteen outline points of a square, which are obtained by equally dividing the outline of the square by sixteen points, with the center of the square as the origin. Herein, assume that the numeral assigned in each of the outline points is the outline point number, and the outline points are followed from the outline point 1 in ascending numeric order.

FIG. 4B shows a locus indicative of the result of following each of the outline points. In FIG. 4B, the abscissa indicates the outline point number n, and the ordinate indicates the coordinate value x or y. As can be seen in FIG. 4B, each of the loci $x(n)$ and $y(n)$ of the coordinates x and y has one cycle of a trapezoid wave.

In step S4 in FIG. 2, the following polar coordinate transformation is performed on the loci. First, the barycenter $(x0, y0)$ of the object image is obtained based on an average value of x coordinates and an average value of y coordinates of the image. With the barycenter $(x0, y0)$ as the origin, polar coordinate transformation is performed according to the following equation.

$$r(n) = \sqrt{(x(n)-x0)^2 + (y(n)-y0)^2}$$
$$\theta(n) = \tan^{-1}((y(n)-y0)/(x(n)-x0)) \quad \text{[Equation 1]}$$

In the first embodiment, wavelet transformation which will be described below is performed only on $r(n)$ obtained by the polar coordinate transformation represented by Equation 1.

Wavelet Transformation Processing

Hereinafter, the aforementioned wavelet transformation processing in step S5 is described with reference to FIGS. 5, 6A and 6B.

Figure 5:
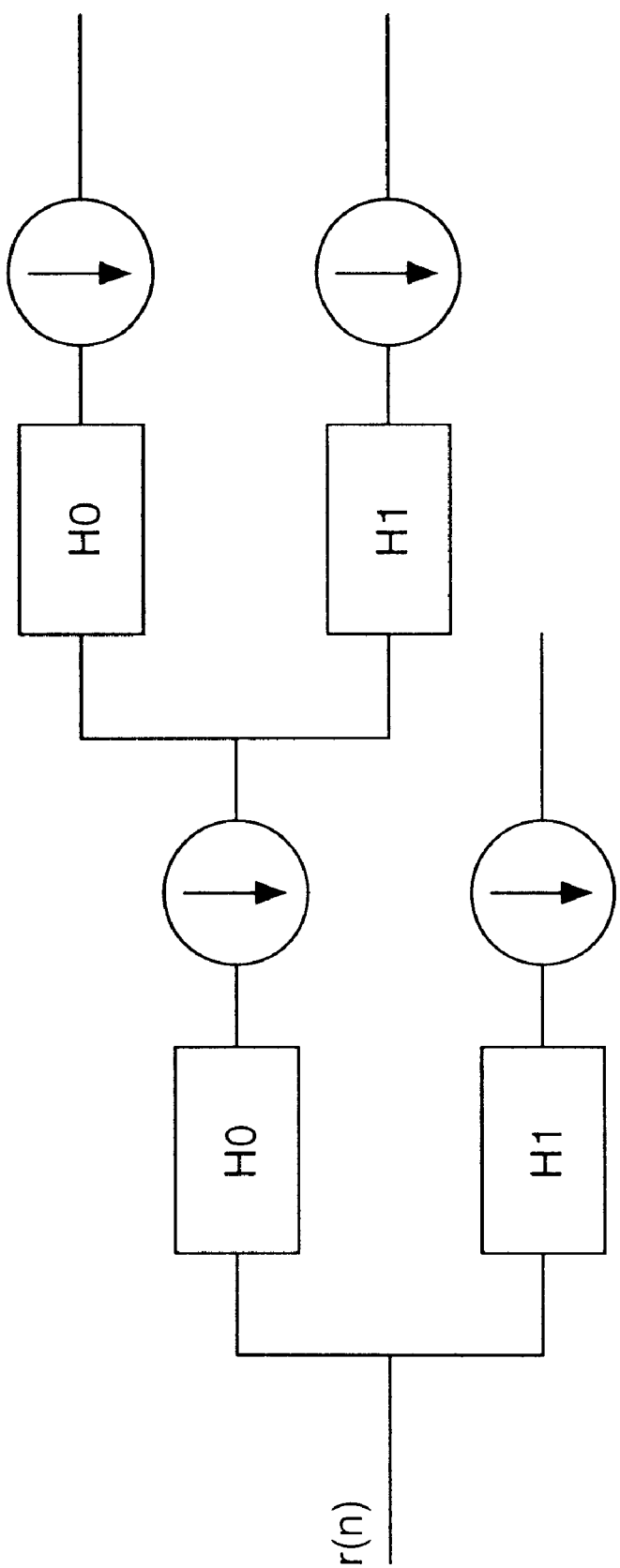
FIG. 5 is an explanatory view of wavelet transformation.

FIG. 5 is an explanatory view of wavelet transformation according to the first embodiment. First, input data $r(n)$ is subjected to the low-pass filter H0 and high-pass filter H1, thereby down-sampling the output of the filters. Then, the output of the low-pass filter H0 is further subjected to a low-pass filter H0 and high-pass filter H1, thereby down-sampling the output of the filters. In this manner, division of frequency components proceeds. As a result, the input data $r(n)$ is transformed into a wavelet descriptor, substantially dividing the input data to plural levels of low frequency components and high frequency components.

Note that the filter coefficient shown in FIG. 5 is, for instance, a simple Haar base. An example is shown in the following equation. Transformation by the low-pass filter H0 is indicated by $H0(z)$, and transformation by the high-pass filter H1 is indicated by $H1(z)$.

$$H0(z) = \frac{1+z^{-1}}{\sqrt{2}}$$
$$H1(z) = \frac{1-z^{-1}}{\sqrt{2}} \quad \text{[Equation 2]}$$

As described above, by transforming $r(n)$ by the low-pass filter H0, a wave H0 is obtained, and by transforming $r(n)$ by the high-pass filter H1, a wave H1 is obtained. In a similar manner, by further performing transformation by the low-pass filter H0 and high-pass filter H1, waves H00 and H01 are obtained. The plural levels of wavelet transformation results with respect to $r(n)$ are stored as $ri(n)$.

Note that similar wavelet transformation is performed also on a plurality (n) of model images in advance, and the transformation results are stored as $rj(n)$ in the database 22.

Hereinafter, a similarity determination method using wavelet transformation according to the first embodiment is described in detail.

Figure 6A:
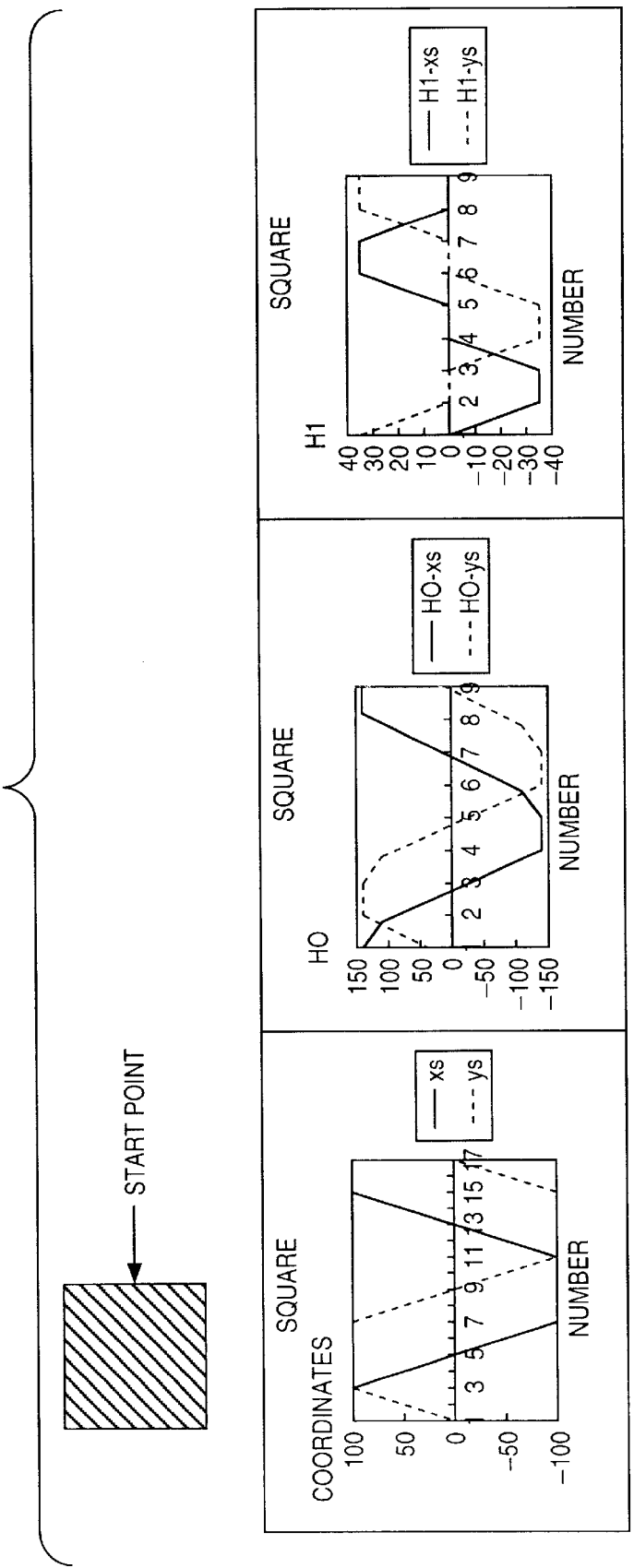
FIGS. 6A and 6B show examples of wavelet descriptors.
Figure 6B:
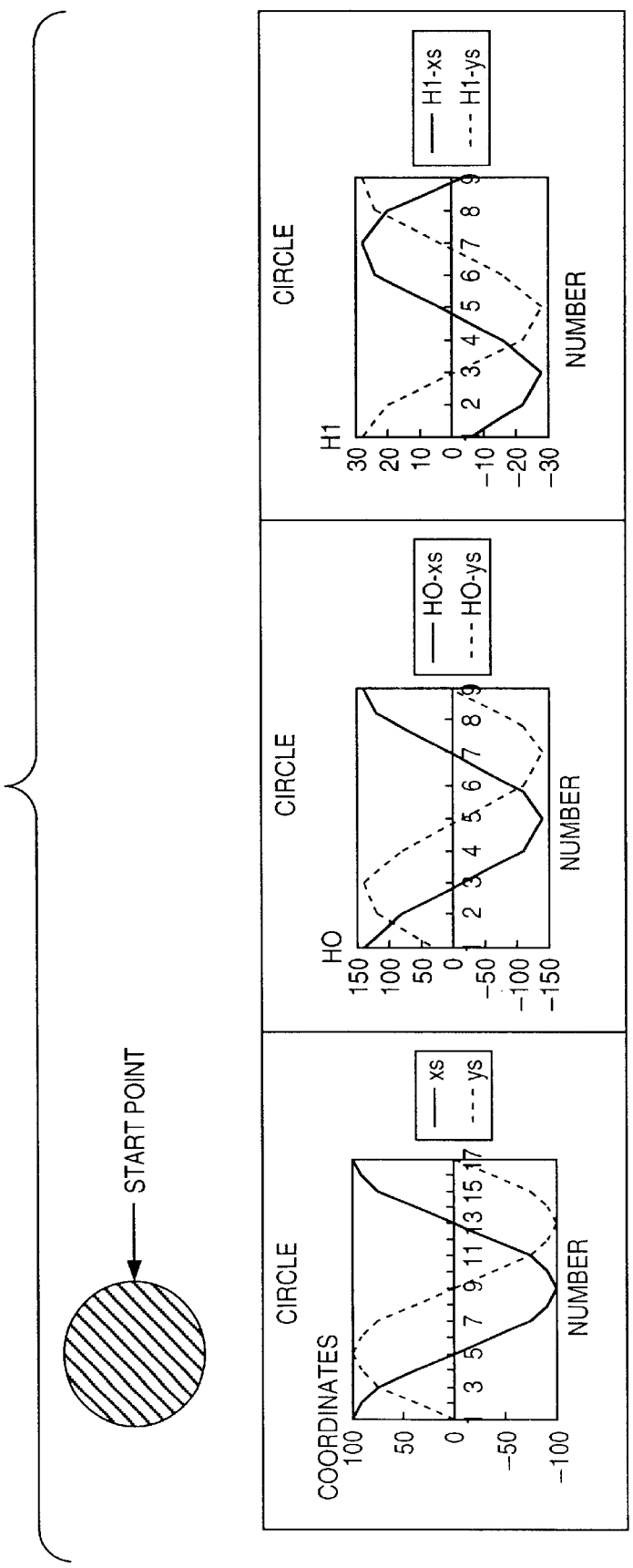

FIGS. 6A and 6B show examples of wavelet descriptors respectively for a square and a circle, expressed in a rectangular coordinate system. Both in FIGS. 6A and 6B, the waveform on the left shows the locus of outline points. The waveform H0 shown in the middle and waveform H1 on the right are the resultant waveforms of polar coordinate transformation and wavelet transformation respectively.

As can be seen from FIGS. 6A and 6B, the waveforms H0s for the square and circle, on which wavelet transformation has been performed, have a similar shape. Therefore, it is determined that the distance between the barycenter and each outline point is substantially equal in both cases of the square and circle. Consequently, in the first embodiment, these figures are determined similar when seen as a rough figure. On the contrary, with respect to figures such as a rectangular, greatly flattened oval, or hollow figure, the similarity between such a figure and a square or circle is determined as low at this stage. Note that since a square and a circle have a large difference in the waveform H1 obtained by wavelet transformation, these figures are distinguishable by the waveform H1.

Note in FIGS. 6A and 6B, the number of reference points indicated by the outline point numbers for the model image and object image is halved in the similarity determination using the waveform H0. Therefore, the similarity calculation according to the first embodiment can be performed twice as fast as the case of using all reference points. Furthermore, in a case where the waveform H0 is further subjected to wavelet transformation thus obtaining a waveform H00, the number of reference points can be reduced to a quarter in the similarity determination using the waveform H00. Therefore, a four-times faster similarity calculation speed can be expected. In other words, if rough similarity calculation is sufficient for the user, high-speed processing can be achieved by using a high-order wavelet descriptor.

Matching Processing

Hereinafter, the aforementioned matching processing in steps S6 and S7 is described with reference to FIG. 7. Steps S6 and S7 in FIG. 2 differ from each other in performing the comparison between a model image and an object image with the use of a low frequency component or high frequency component.

The first embodiment is characterized by performing matching processing while taking into consideration an influence of the start point of outline following processing. If the start point of outline following processing differs in the model image and object image, a Sim value, a similarity index to be described later, also differs. Therefore, according to the first embodiment, the start point of outline following processing in the model image is shifted point by point, thereby obtaining a plurality of Sim values for an object image. Among the plurality of Sim values obtained, the smallest value is the similarity between the model image and object image.

Figure 7:
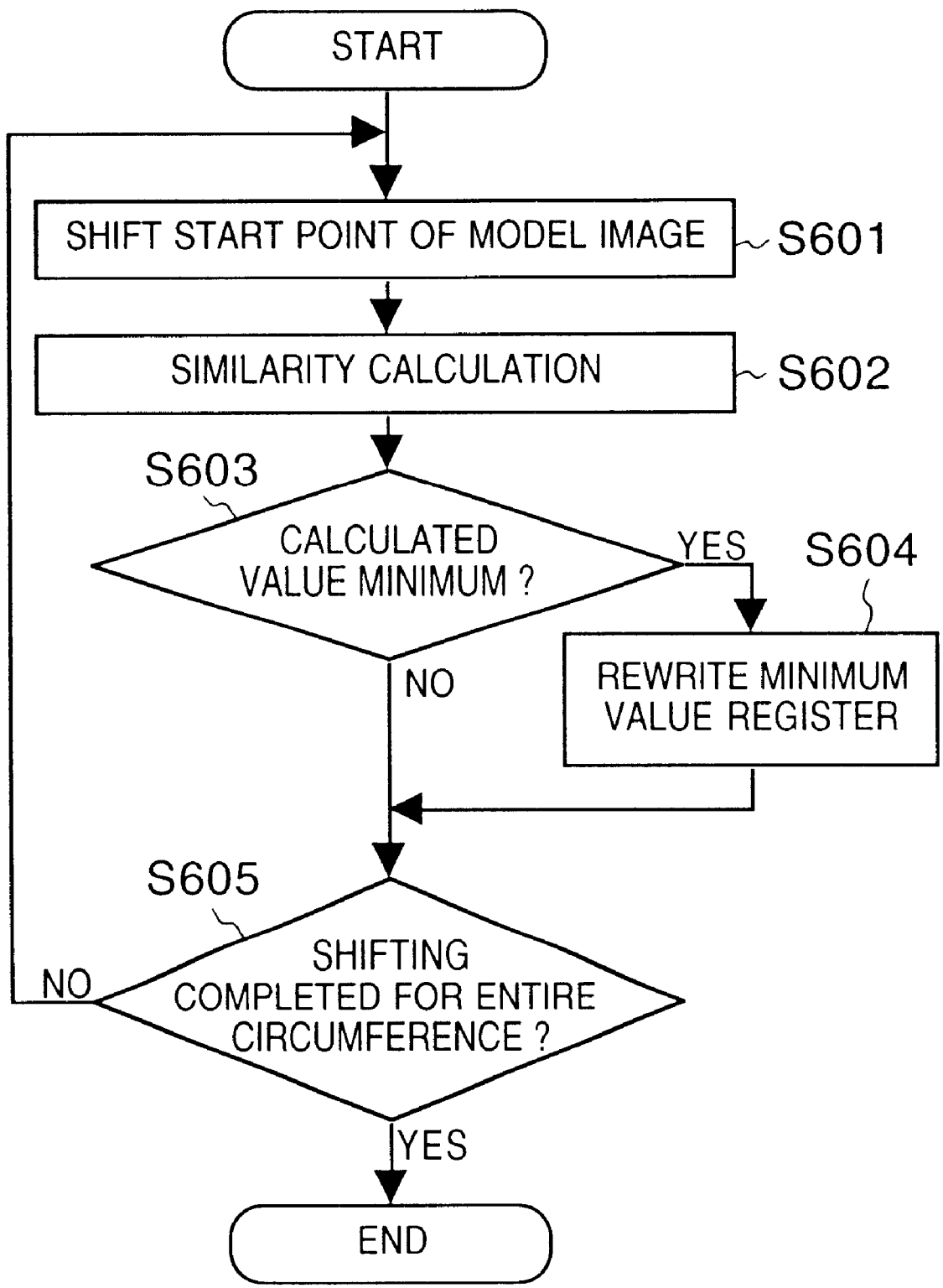
FIG. 7 is a flowchart showing matching processing according to the first embodiment.

FIG. 7 is a flowchart showing similarity calculation processing, i.e., matching processing, between an object image and a model image. First in step S601, the outline-following start point of a waveform of the referring model image is shifted by one point. In step S602, Sim value, the similarity index, is calculated by the following equation.

$$Sim = \sum_{n=0}^{N-1} (ri(n) - rj(n))^2 \quad \text{[Equation 3]}$$

In Equation 3, ri(n) and rj(n) respectively indicate the outline point values of an object image and a model image, on which wavelet transformation has been performed. As mentioned above, plural levels of wavelet transformation results are obtained by performing wavelet transformation on the outline points. It is to be noted that ri(n) and rj(n) subjected to comparison are in the same level.

Next in step S603, the Sim value obtained in step S602 is compared with the value stored in the minimum value register (not shown) in order to determine whether or not the Sim value of interest is the smallest value so far in the outline following processing. If the Sim value of interest is the smallest value, the value in the minimum value register is replaced by this Sim value in step S604. Then, in step S605, when it is determined that the outline-point shifting is completed for the entire circumference of the outline, the processing ends. In other words, the Sim value, stored ultimately in the minimum value register, is the similarity index for the model image.

By performing the matching processing, shown in the flowchart of FIG. 7, with respect to each of the plurality of model images registered in the database 22, the Sim value indicative of the similarity index of the object image is calculated for each model image. The model image, having the smallest Sim value, can be determined most similar to the object image.

In step S6 in FIG. 2, the matching processing shown in FIG. 7 is performed with respect to the level corresponding to low frequency components of ri(n) and rj(n), thereby extracting a Sim value, having a predetermined value or lower, from the calculated plurality of Sim values. In other words, from the plurality of model images, a model image candidate most similar to the object image is obtained. Herein, if rough similarity is sufficient for the user, the matching processing in step S7 is not performed, but the processing proceeds to step S8 where the model image extracted in step S6 is displayed on the display portion 26 together with the similarity (Sim value).

If similarity determination is desired with higher precision, matching processing with higher precision is performed in step S7 in FIG. 2 on the model image extracted in step S6, with respect to the level corresponding to high frequency components of ri(n) and rj(n). In step S8, the model image having the smallest Sim value, obtained by the matching processing in step S7, is displayed on the display portion 26 together with the similarity (Sim value).

As has been described above, according to the first embodiment, since the similarity calculation between a model image and an object image is performed based on the wavelet descriptor representing an outline, it is possible to reduce the number of reference points, thus enabling high-speed processing.

Furthermore, since an approximate similarity or local similarity can be detected in accordance with the level of wavelet transformation, similarity calculation that meets the user's needs can be performed.

Furthermore, by virtue of the similarity calculation method of the first embodiment, high-speed image retrieval is possible. More specifically, an image desired by a user may be inputted as an object image, then similarity calculation is performed between the object image and a plurality of model images stored in the database, and a model image having a highest similarity value or having a predetermined value or larger may be outputted as a retrieval result.

Second Embodiment

Hereinafter, a second embodiment of the present invention is described.

The foregoing first embodiment has described an example of calculating the similarity with respect to an outline shape of a model image and an object image. In the second embodiment, similarities in color and texture are also taken into account.

Figure 8:
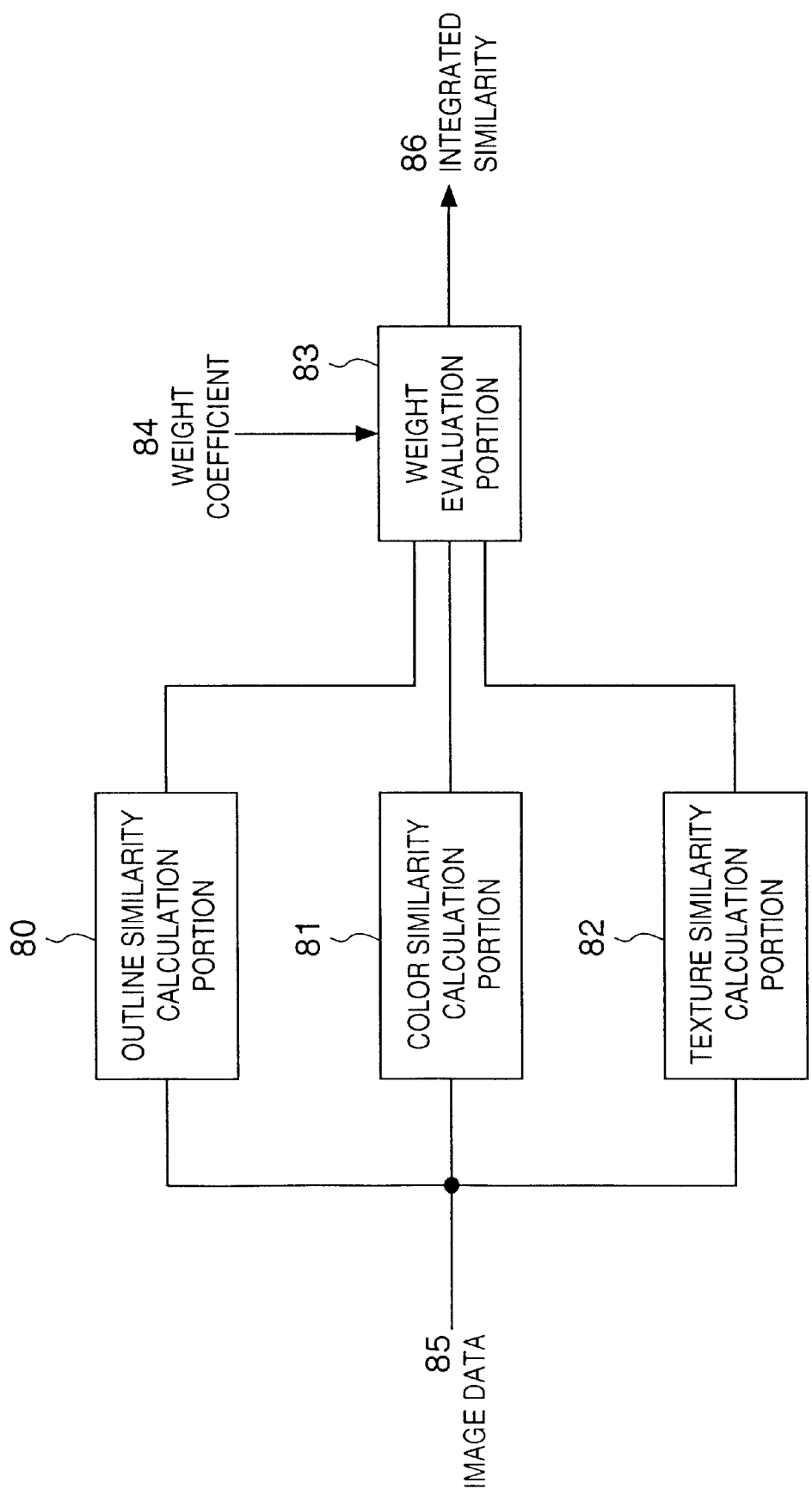
FIG. 8 is a block diagram showing a similarity calculation function according to a second embodiment of the present invention.

FIG. 8 is a block diagram showing a similarity calculation function according to the second embodiment. In FIG. 8, reference numeral 80 denotes an outline similarity calculation portion having a construction shown in FIG. 1 which is described in the first embodiment. More specifically, the outline similarity calculation portion 80 performs outline similarity calculation processing, described in the first embodiment, when image data 85 is inputted as an object image.

Reference numeral 81 denotes a color similarity calculation portion including database, storing average color value data of the model images which are commonly used by the outline similarity calculation portion 80. The color similarity calculation portion 81 calculates a color similarity based on a difference between the average color value of an object image and that of a model image.

Reference numeral 82 denotes a texture similarity calculation portion including database, storing spatial frequency distribution data of the model images which are commonly used by the outline similarity calculation portion 80. The texture similarity calculation portion 82 calculates a texture similarity based on a difference between the spatial frequency distribution of an object image and that of a model image.

Reference numeral 83 denotes a weight evaluation portion, where the aforementioned three similarities and a weight coefficient 84 which is set by a controller (not shown), are inputted. The weight coefficient 84 indicates which of the three similarities is to be emphasized. In accordance with the weight coefficient 84, a weight is added to the aforementioned three similarities, and the result is outputted as an integrated similarity 86.

As described above, according to the second embodiment, since similarity calculation is performed with respect to a color and texture in addition to an outline shape, the similarity can be determined with higher precision than the first embodiment.

Other Embodiments

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or recording medium) recording program codes for performing the aforesaid processes to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention. Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

In a case where the present invention is applied to the aforesaid storage medium, the storage medium stores program codes corresponding to the flowcharts (FIG. 2 and/or FIG. 7) described in the above embodiments.

As many apparently widely different embodiments of the present invention can be made without departing from the spirit and scope thereof, it is to be understood that the invention is not limited to the specific embodiments thereof except as defined in the claims.

What is claimed is:

1. An image processing method comprising:
    an object extraction step of extracting an object image from image data;
    an outline point extraction step of extracting a predetermined number of outline points from an outline of the object image;
    a wavelet transformation step of performing wavelet transformation on the outline points; and
    a similarity calculation step of calculating a similarity between the object image and a predetermined model image based on a wavelet transformation result,
    wherein said similarity calculation step further comprises:
        a first calculation step of calculating a similarity between the object image and the model image based on a component corresponding to a low frequency component of the wavelet transformation result; and
        a second calculation step of calculating a similarity between the object image and the model image based on a component corresponding to a high frequency component of the wavelet transformation result, and
    wherein, in said first and second calculation steps, the similarity is calculated by integrating a difference in outline points between the object image and the model image.

2. The method according to claim 1, further comprising a polar coordinate transformation step of performing polar coordinate transformation on the outline points, extracted in said outline point extraction step, with a barycenter of the object image as a center of a coordinate system,
    wherein in said wavelet transformation step, wavelet transformation is performed on outline points expressed by polar coordinates.

3. The method according to claim 1, wherein in said outline point extraction step, the predetermined number of outline points are obtained by equally dividing the outline of the object image.

4. The method according to claim 1, wherein in said second calculation step, the similarity is calculated with respect to a model image, whose similarity calculated in said first calculation step is a predetermined value or larger.

5. The method according to claim 1, wherein wavelet transformation is performed in advance on outline points of the model image.

6. The method according to claim 1, further comprising a display step of displaying the similarity calculated in said similarity calculation step.

7. The method according to claim 1, further comprising:
    a color similarity calculation step of calculating a color similarity between the object image and the model image;
    a texture similarity calculation step of calculating a texture similarity between the object image and the model image; and
    an integrated similarity calculation step of calculating an integrated similarity between the object image and the model image by adding a weight to the similarities which are respectively calculated in said color similarity calculation step, said texture similarity calculation step, and said similarity calculation step.

8. An image processing apparatus comprising:

object extraction means for extracting an object image from image data;

outline point extraction means for extracting a predetermined number of outline points from an outline of the object image;

wavelet transformation means for performing wavelet transformation on the outline points; and similarity calculation means for calculating a similarity between the object image and a predetermined model image based on a wavelet transformation result, wherein said similarity calculation means comprises:

first calculation means for calculating a similarity between the object image and the model image based on a component corresponding to a low frequency component of the wavelet transformation result; and second calculation means for calculating a similarity between the object image and the model image based on a component corresponding to a high frequency component of the wavelet transformation result, and wherein, in said first and second calculation means, the similarity is calculated by integrating a difference in outline points between the object image and the model image.

9. The apparatus according to claim 8, further comprising storage means for storing, in advance, wavelet transformation results of a plurality of model images.

10. The apparatus according to claim 8, further comprising display means for displaying the similarity calculated by said similarity calculation means.

11. The apparatus according to claim 8, further comprising:

color similarity calculation means for calculating a color similarity between the object image and the model image;

texture similarity calculation means for calculating a texture similarity between the object image and the model image; and integrated similarity calculation means for calculating an integrated similarity between the object image and the model image by adding a weight to the similarities which are respectively calculated by said color similarity calculation means, said texture similarity calculation means, and said similarity calculation means.

12. A computer program product comprising a computer readable medium having computer program code, for determining a similarity of images, said product comprising:

code for an object extraction step of extracting an object image from image data;

code for an outline point extraction step of extracting a predetermined number of outline points from an outline of the object image;

code for a wavelet transformation step of performing wavelet transformation on the outline points; and code for a similarity calculation step of calculating a similarity between the object image and a predetermined model image based on a wavelet transformation result, wherein said code for a similarity calculation step comprises:

code for a first calculation step of calculating a similarity between the object image and the model image based on a component corresponding to a low frequency component of the wavelet transformation result; and code for a second calculation step of calculating a similarity between the object image and the model image based on a component corresponding to a high frequency component of the wavelet transformation result, and wherein, in the first and second calculation steps, the similarity is calculated by integrating a difference in outline points between the object image and the model image.

* * * * *